No. 614,706. Patented Nov. 22, 1898.
L. C. DIZE.
CRAB SCRAPE BAG.
(Application filed May 12, 1898.)
(No Model.) 2 Sheets—Sheet 1.
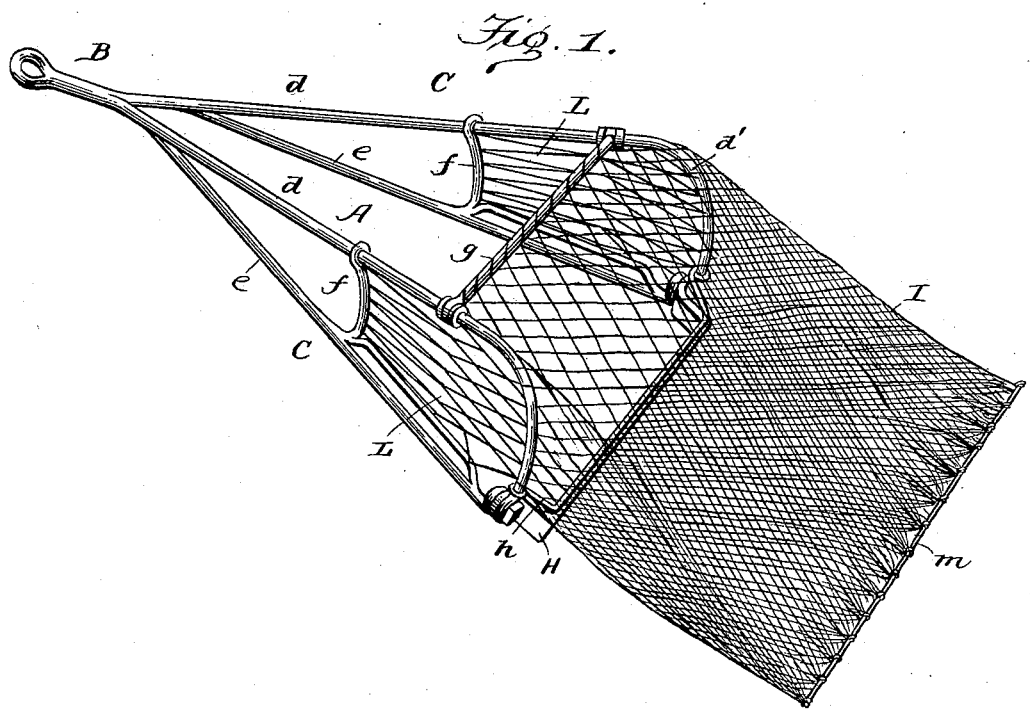
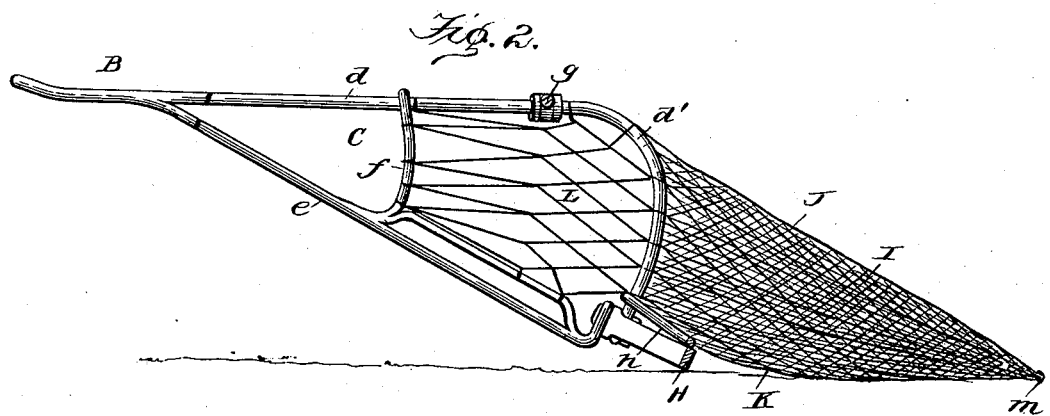
WITNESSES:
C. C. Hines
Gladys L. Thompson
INVENTOR:
L. C. Dize.
BY
R. S. & A. B. Lacey,
ATTORNEYS.
THE NORRIS PETERS CO., PHOTO-LITHO., WASHINGTON, D. C.

No. 614,706. Patented Nov. 22, 1898.
L. C. DIZE.
CRAB SCRAPE BAG.
(Application filed May 12, 1898.)
(No Model.) 2 Sheets—Sheet 2.
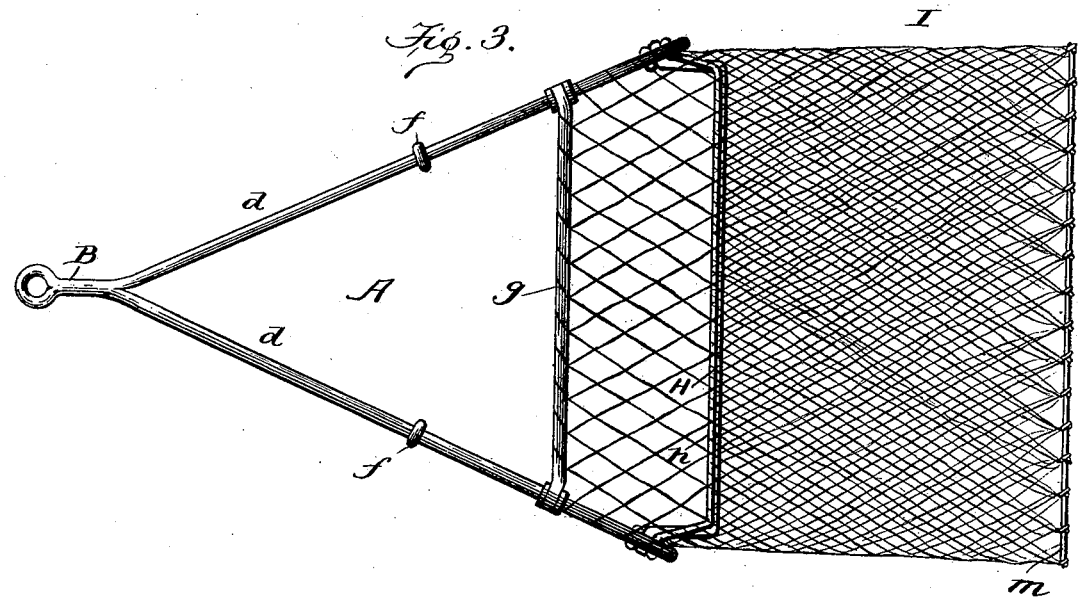
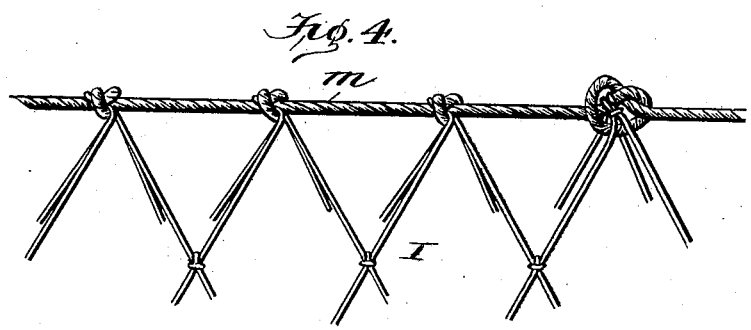
WITNESSES: C. C. Hines, Gladys L. Thompson
INVENTOR: L. C. Dize
BY R. & A. B. Lacey, ATTORNEYS.
THE NORRIS PETERS CO., PHOTO-LITHO., WASHINGTON, D. C.

UNITED STATES PATENT OFFICE.

LEWIS C. DIZE, OF CRISFIELD, MARYLAND.

CRAB SCRAPE-BAG.

SPECIFICATION forming part of Letters Patent No. 614,706, dated November 22, 1898.

Application filed May 12, 1898. Serial No. 680,490. (No model.)

*To all whom it may concern:*

Be it known that I, LEWIS C. DIZE, a citizen of the United States, residing at Crisfield, in the county of Somerset and State of Maryland, have invented certain new and useful Improvements in Crab Scrape-Bags; and I do hereby declare the following to be a full, clear, and exact description of the invention, such as will enable others skilled in the art to which it appertains to make and use the same.

This invention relates to improvements in crab scrape nets or bags; and it consists in certain novel features of construction and combination of parts, which will be hereinafter more fully described and claimed.

The object of the invention is to provide a drag or spreader frame and net which are simple, durable, and inexpensive in construction and in which the net is constructed and arranged in a novel and peculiar manner, so that the mouth thereof is normally held open to permit free entrance of the crabs thereinto and the rear end contracted, so that the crabs will be entangled in the meshes and firmly held, and also strengthened by a transverse stay or stiffening cord to prevent parting of the strands under strain and undue bulging out of the net at one side of its center.

In the accompanying drawings, forming a part of this specification, Figure 1 is a perspective view of a crab scrape bag or net constructed in accordance with my invention. Fig. 2 is a central longitudinal section of same. Fig. 3 is a top plan view, and Fig. 4 is a detail view, of a portion of the net and stay or stiffening cord.

Referring now more particularly to the drawings, wherein like letters of reference designate corresponding parts throughout the several views, A represents a drag or spreader frame, which is substantially triangular in form, having at its front end a shank B, formed with an eye for attachment to a drag-rope or handle and provided with the converging side arms C. Each of said side arms comprises in its construction upper and lower rods or bars $d$ and $e$, the former having their front ends curved downwardly at $d'$ and suitably connected at their front ends to the latter, and the two bars being also connected intermediate of their lengths by short vertical stays $f$. Connecting the upper bars or rods of the side arms is a transverse rod $g$, and secured to the rear ends of the arms in line with the lower rods or bars thereof is a transverse bail-shaped drag or scraper bar H, on which the frame is supported as it is dragged along the bed of a stream. The position of this bar is clearly shown in Figs. 1 and 2. A bail-shaped net-attaching rod $h$ is connected to the lower rear curved ends of the upper bars $d$ and preferably extends parallel with the scraper-bar, but on a plane above the same.

The broad top and bottom portions of the net I are of the same width throughout; but the top portion J is made comparatively longer than the bottom portion K, and its front end is connected to the curved ends $d'$ of the bars $d$ and to the transverse rod $g$, so as to overhang and project forwardly of the scraper-bar H and rod $h$, to which the front end of said bottom portion is connected, the object of this construction being to prevent the escape of the crabs in an upward direction as they are being scooped up into the net. Extensions L of the net are also secured to and close the rear ends of the open side arms C of the frame, so as to prevent the crabs from escaping at the sides. By this construction and manner of connecting the net to the frame it will be seen that the top and bottom portions of the net are arranged in the form of a horizontally-positioned letter V, thereby forming a comparatively wide mouth at the forward end thereof for entrance of the crabs thereinto and a contracted rear end in the meshes of which the crabs are entangled and held from escaping. Extending across the contracted rear end of the net is a stout stay or stiffening-cord $m$, which may be secured in any desired manner, but is preferably tied to the strands of the meshes throughout. This cord effectually stiffens the net and maintains it in its normal position, so that it may be readily and conveniently inverted to dump the crabs without tangling. It also prevents parting of the strands and bulging out of the net at one side of its center under the weight of crabs or shells, rocks, and other foreign matter which may be picked up and sustains the strain which would otherwise fall on the immediate weaker strands of the netting and cause the same to break.

While I am aware that various forms of stays have been heretofore employed in various relations for bracing parts under strain, I believe that I am the first to conceive and devise a crab scrape bag or net having a transverse stiffening-cord located, as described, at the contracted bottom or rear end of the net, whereby the life of the net is prolonged and the objections incident to the ordinary form of net of this character entirely obviated.

It will of course be understood that changes in the form, proportion, and minor details of construction may be made within the scope of the invention without departing from the spirit or sacrificing any of the advantages thereof.

Having thus fully described my invention, what I claim as new and useful, and desire to secure by Letters Patent, is—

A crab scrape net or bag, comprising a substantially triangular drag or spreader frame having converging open side arms, a scraper-bar extending between said arms at the base portion of the open rear end of the frame, a transverse rod or bar arranged in advance of the scraper-bar and connecting the upper portions of said side arms, a net having a top portion secured at its front end to the transverse bar or rod and a bottom portion secured at its front end to the frame adjacent to the scraper-bar and extended rearwardly therefrom to form a contracted rear end, a transverse stay or stiffening-cord secured to the said contracted end of the net, and a netting closing the open rear ends of said side arms below the said transverse bar or rod, substantially as described.

In testimony whereof I affix my signature in presence of three witnesses.

LEWIS C. DIZE.

Witnesses:
L. J. RIGGIN,
R. L. WHARTON,
JOHN X M. DIZE.
    his
    mark